(12) United States Patent
Morris et al.

(10) Patent No.: US 11,526,520 B2
(45) Date of Patent: Dec. 13, 2022

(54) CONTEXT-BASED ACTIONS FROM A SOURCE APPLICATION

(71) Applicant: Microsoft Technology Licensing, LLC, Redmond, WA (US)

(72) Inventors: Max Glenn Morris, Seattle, WA (US); Sashi Raghupathy, Redmond, WA (US); Manoj Kumar Biswas, Redmond, WA (US); Amy Rambhia, Seattle, WA (US); Daniel Oliver, Seattle, WA (US); Robert Emmett Kolba, Jr., Seattle, WA (US); Sandy Wong, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 16/528,088

(22) Filed: Jul. 31, 2019

(65) Prior Publication Data

US 2020/0065308 A1    Feb. 27, 2020

Related U.S. Application Data

(63) Continuation of application No. 15/298,106, filed on Oct. 19, 2016, now Pat. No. 10,409,819, which is a
(Continued)

(51) Int. Cl.
*G06F 16/2457*    (2019.01)
*G06F 3/04842*    (2022.01)
(Continued)

(52) U.S. Cl.
CPC ........ *G06F 16/24575* (2019.01); *G06F 3/048* (2013.01); *G06F 3/0482* (2013.01);
(Continued)

(58) Field of Classification Search
CPC .................................................. G06F 16/24575
(Continued)

(56) References Cited

U.S. PATENT DOCUMENTS 5,175,854 A    12/1992  Cheung et al.
5,870,559 A    2/1999   Leshem et al.
(Continued)

FOREIGN PATENT DOCUMENTS

CN    102426511 A1    4/2012
CN    102449626 A     5/2012
(Continued)

OTHER PUBLICATIONS

"Office Action Issued in Chinese Patent Application No. 201380076971.8", dated Oct. 8, 2019, 12 Pages.
(Continued)

*Primary Examiner* — Sheree N Brown
(74) *Attorney, Agent, or Firm* — Rainier Patents, P.S.

(57) ABSTRACT

An action framework system provides context-based actions in association with a source application. The source application detects selection of a content element presented by the source application. The content element is associated with an application identifier identifying a target application and an action identifier identifying an operation to be executed by the target application on the content element. The target application identified by the application identifier is executed to perform the operation identified by the action identifier on the content element, responsive to detection of the selection of the content element. In one implementation, the source application is a search feature providing different contexts of search results (e.g., from a local file system search, a local application content search, a Web search, a remote application content search).

20 Claims, 8 Drawing Sheets

Related U.S. Application Data continuation of application No. 14/011,886, filed on Aug. 28, 2013, now Pat. No. 10,430,418.

(60) Provisional application No. 61/828,535, filed on May 29, 2013.

(51) Int. Cl.
  *G06F 16/242* (2019.01)
  *G06F 16/9535* (2019.01)
  *G06F 9/445* (2018.01)
  *G06F 3/048* (2013.01)
  *G06F 3/0482* (2013.01)

(52) U.S. Cl.
  CPC .......... *G06F 3/04842* (2013.01); *G06F 9/445* (2013.01); *G06F 16/2423* (2019.01); *G06F 16/2425* (2019.01); *G06F 16/9535* (2019.01)

(58) Field of Classification Search
  USPC .......................................... 707/710
  See application file for complete search history.

(56) References Cited

U.S. PATENT DOCUMENTS

| | | | |
|---|---|---|---|
| 6,144,962 A | 11/2000 | Weinberg et al. | |
| 6,185,591 B1 | 2/2001 | Baker et al. | |
| 6,463,460 B1 | 10/2002 | Simonoff | |
| 6,557,013 B1 | 4/2003 | Ziff et al. | |
| 6,601,057 B1 | 7/2003 | Underwood et al. | |
| 6,697,825 B1 | 2/2004 | Underwood et al. | |
| 6,704,743 B1 | 3/2004 | Martin et al. | |
| 6,738,766 B2 | 5/2004 | Peng | |
| 6,857,012 B2 | 2/2005 | Sim et al. | |
| 6,873,995 B2 | 3/2005 | Benson et al. | |
| 6,874,001 B2 | 3/2005 | Narang et al. | |
| 6,904,454 B2 | 6/2005 | Stickler | |
| 6,983,288 B1 | 1/2006 | Kirkwood et al. | |
| 7,124,125 B2 | 10/2006 | Cook et al. | |
| 7,130,885 B2 | 10/2006 | Chandra | |
| 7,133,845 B1 | 11/2006 | Ginter et al. | |
| 7,152,207 B1 | 12/2006 | Underwood et al. | |
| 7,475,346 B1 | 1/2009 | Bullock et al. | |
| 7,660,902 B2 | 2/2010 | Graham et al. | |
| 7,668,913 B1 | 2/2010 | Char et al. | |
| 7,676,517 B2 | 3/2010 | Hurst-Miller et al. | |
| 7,693,827 B2 | 4/2010 | Zamir | |
| 7,716,199 B2 | 5/2010 | Guha | |
| 7,779,352 B1 | 8/2010 | Underwood et al. | |
| 7,844,835 B2 | 11/2010 | Ginter et al. | |
| 7,849,079 B2 | 12/2010 | Chandrasekar et al. | |
| 7,873,356 B2 | 1/2011 | Flynt et al. | |
| 7,886,221 B1 | 2/2011 | Underwood et al. | |
| 7,904,799 B1 | 3/2011 | Underwood et al. | |
| 7,904,804 B1 | 3/2011 | Wilson et al. | |
| 7,917,749 B2 | 3/2011 | Ginter et al. | |
| 7,933,338 B1 | 4/2011 | Choudhry et al. | |
| 8,060,487 B2 | 11/2011 | Schmidt-Karaca | |
| 8,136,027 B2 | 3/2012 | Underwood et al. | |
| 8,204,897 B1 | 6/2012 | Djabarov et al. | |
| 8,301,614 B2 | 10/2012 | Kraft et al. | |
| 8,352,467 B1 | 1/2013 | Guha | |
| 8,429,630 B2 | 4/2013 | Nickolov et al. | |
| 8,533,761 B1 | 9/2013 | Sahami et al. | |
| 8,533,851 B2 | 9/2013 | Ginter et al. | |
| 8,543,842 B2 | 9/2013 | Ginter et al. | |
| 8,712,986 B2 | 4/2014 | Sidlosky et al. | |
| 8,762,360 B2 | 6/2014 | Jiang et al. | |
| 8,954,420 B1 | 2/2015 | Khan et al. | |
| 8,996,520 B2 | 3/2015 | Chang et al. | |
| 9,015,140 B2 | 4/2015 | Wu et al. | |
| 9,124,647 B2 * | 9/2015 | Williams | H04L 67/327 |
| 9,141,701 B2 | 9/2015 | Lazaridis et al. | |
| 9,268,462 B2 | 2/2016 | Civelli et al. | |
| 9,310,958 B2 * | 4/2016 | Kluttz | G06F 3/0481 |
| 9,405,772 B2 | 8/2016 | Petrou et al. | |
| 9,557,896 B1 | 1/2017 | Toff et al. | |
| 9,606,720 B1 | 3/2017 | Asver et al. | |
| 2001/0011265 A1 | 8/2001 | Cuan et al. | |
| 2001/0044834 A1 | 11/2001 | Bradshaw et al. | |
| 2002/0138582 A1 | 9/2002 | Chandra et al. | |
| 2002/0156702 A1 | 10/2002 | Kane | |
| 2002/0178271 A1 | 11/2002 | Graham et al. | |
| 2003/0005409 A1 | 1/2003 | Tumati | |
| 2003/0051164 A1 | 3/2003 | Patton | |
| 2003/0056025 A1 | 3/2003 | Moses et al. | |
| 2003/0195885 A1 | 10/2003 | Emmick et al. | |
| 2004/0167890 A1 | 8/2004 | Eyal | |
| 2004/0199867 A1 | 10/2004 | Brandenborg | |
| 2005/0125431 A1 | 6/2005 | Emmick et al. | |
| 2005/0137908 A1 | 6/2005 | Fusari et al. | |
| 2005/0149498 A1 | 7/2005 | Lawrence et al. | |
| 2005/0149500 A1 | 7/2005 | Marmaros et al. | |
| 2005/0165777 A1 | 7/2005 | Hurst-Hiller et al. | |
| 2006/0074883 A1 | 4/2006 | Teevan et al. | |
| 2006/0190429 A1 | 8/2006 | Sidlosky et al. | |
| 2006/0200556 A1 | 9/2006 | Brave et al. | |
| 2006/0200751 A1 | 9/2006 | Underwood et al. | |
| 2007/0027866 A1 | 2/2007 | Schmidt-Karaca | |
| 2007/0038601 A1 | 2/2007 | Guha | |
| 2007/0043704 A1 | 2/2007 | Raub et al. | |
| 2007/0067272 A1 | 3/2007 | Flynt et al. | |
| 2007/0088686 A1 | 4/2007 | Hurst-Hiller et al. | |
| 2007/0150464 A1 | 6/2007 | Brave et al. | |
| 2007/0185846 A1 | 8/2007 | Budzik et al. | |
| 2007/0198741 A1 | 8/2007 | Duffy et al. | |
| 2007/0239781 A1 * | 10/2007 | Kraft | H04N 21/4586 348/E7.063 |
| 2007/0276733 A1 * | 11/2007 | Geshwind | G06Q 30/02 705/14.49 |
| 2007/0288247 A1 | 12/2007 | Mackay | |
| 2008/0077558 A1 | 3/2008 | Lawrence et al. | |
| 2008/0104036 A1 | 5/2008 | Lin | |
| 2008/0109472 A1 | 5/2008 | Underwood et al. | |
| 2008/0120129 A1 | 5/2008 | Seubert et al. | |
| 2008/0134049 A1 | 6/2008 | Gupta et al. | |
| 2008/0140912 A1 | 6/2008 | Pandya | |
| 2008/0172693 A1 | 7/2008 | Ludvig | |
| 2008/0195664 A1 | 8/2008 | Maharajh et al. | |
| 2008/0214155 A1 | 9/2008 | Ramer et al. | |
| 2008/0215675 A1 | 9/2008 | Kaminitz et al. | |
| 2008/0262990 A1 | 10/2008 | Kapoor | |
| 2008/0288965 A1 | 11/2008 | Grechanik et al. | |
| 2009/0044146 A1 | 2/2009 | Patel et al. | |
| 2009/0119678 A1 | 5/2009 | Shih et al. | |
| 2009/0150784 A1 | 6/2009 | Denney et al. | |
| 2009/0158318 A1 | 6/2009 | Levy | |
| 2009/0182721 A1 * | 7/2009 | Yang | G06F 16/532 707/E17.022 |
| 2009/0248695 A1 | 10/2009 | Ozzie et al. | |
| 2009/0327236 A1 | 12/2009 | Denney et al. | |
| 2009/0327272 A1 | 12/2009 | Koivunen | |
| 2010/0005061 A1 | 1/2010 | Basco et al. | |
| 2010/0005087 A1 | 1/2010 | Basco et al. | |
| 2010/0069035 A1 | 3/2010 | Johnson | |
| 2010/0070606 A1 | 3/2010 | Shenfield et al. | |
| 2010/0122187 A1 | 5/2010 | Kunori et al. | |
| 2010/0131494 A1 | 5/2010 | Venolia | |
| 2010/0205551 A1 | 8/2010 | Underwood et al. | |
| 2010/0287170 A1 | 11/2010 | Liu et al. | |
| 2010/0306644 A1 | 12/2010 | Underwood et al. | |
| 2010/0312782 A1 | 12/2010 | Li et al. | |
| 2010/0323762 A1 | 12/2010 | Sindhu | |
| 2011/0052144 A1 | 3/2011 | Abbas et al. | |
| 2011/0072494 A1 | 3/2011 | Sato | |
| 2011/0131241 A1 | 6/2011 | Patrou et al. | |
| 2011/0167458 A1 | 7/2011 | Shenfield et al. | |
| 2011/0179021 A1 | 7/2011 | Wen et al. | |
| 2011/0179477 A1 | 7/2011 | Starnes et al. | |
| 2011/0191332 A1 | 8/2011 | Barve et al. | |
| 2011/0196864 A1 | 8/2011 | Mason et al. | |
| 2011/0212717 A1 | 9/2011 | Rhoads et al. | |
| 2011/0214157 A1 | 9/2011 | Korsunsky et al. | |

(56) References Cited

U.S. PATENT DOCUMENTS

| | | |
|---|---|---|
| 2011/0225417 A1 | 9/2011 | Maharajh et al. |
| 2011/0264656 A1 | 10/2011 | Dumais et al. |
| 2011/0295852 A1 | 12/2011 | Wang |
| 2012/0117118 A1 | 5/2012 | Patil et al. |
| 2012/0124061 A1 | 5/2012 | Macbeth et al. |
| 2012/0124519 A1 | 5/2012 | Uphoff et al. |
| 2012/0272304 A1 | 5/2012 | Liao et al. |
| 2012/0144281 A1 | 6/2012 | Schechter et al. |
| 2012/0166276 A1 | 6/2012 | Chitnis et al. |
| 2012/0179706 A1 | 7/2012 | Hobbs et al. |
| 2012/0192061 A1* | 7/2012 | Fine .................. G06F 16/957 715/235 |
| 2012/0204131 A1* | 8/2012 | Hoang ................ G06F 3/04817 715/835 |
| 2012/0239643 A1 | 9/2012 | Ekstrand et al. |
| 2012/0260202 A1 | 10/2012 | Jiang et al. |
| 2012/0271807 A1 | 10/2012 | Smyth et al. |
| 2012/0284247 A1 | 11/2012 | Jiang et al. |
| 2012/0290399 A1 | 11/2012 | England et al. |
| 2012/0290441 A1 | 11/2012 | Mahaniok et al. |
| 2012/0290446 A1 | 11/2012 | England et al. |
| 2012/0297314 A1 | 11/2012 | Stein |
| 2012/0304200 A1 | 11/2012 | Oliver et al. |
| 2012/0310922 A1 | 12/2012 | Johnson et al. |
| 2012/0316955 A1 | 12/2012 | Panguluri et al. |
| 2012/0323898 A1 | 12/2012 | Kumar et al. |
| 2013/0018867 A1 | 1/2013 | Regan et al. |
| 2013/0019237 A1 | 1/2013 | Pardehpoosh et al. |
| 2013/0031075 A1 | 1/2013 | El Daher et al. |
| 2013/0097146 A1 | 4/2013 | Lanphear et al. |
| 2013/0212528 A1 | 8/2013 | Lazaridis et al. |
| 2013/0275924 A1* | 10/2013 | Weinberg ........... G01C 21/3664 715/863 |
| 2013/0339498 A1 | 12/2013 | Johnson |
| 2014/0032518 A1 | 1/2014 | Cohen et al. |
| 2014/0040307 A1 | 2/2014 | Kavety Loganathan et al. |
| 2014/0172912 A1 | 6/2014 | Morris |
| 2014/0181280 A1 | 6/2014 | Collins et al. |
| 2014/0280234 A1 | 9/2014 | Chang et al. |
| 2014/0330821 A1 | 11/2014 | Tullis et al. |
| 2014/0358887 A1 | 12/2014 | Morris et al. |
| 2014/0358909 A1 | 12/2014 | Kolba et al. |
| 2014/0358910 A1 | 12/2014 | Frigon et al. |
| 2014/0358916 A1 | 12/2014 | Anand et al. |
| 2014/0358970 A1 | 12/2014 | Morris et al. |
| 2014/0359598 A1 | 12/2014 | Oliver et al. |
| 2015/0379095 A1 | 12/2015 | Lazaridis et al. |

FOREIGN PATENT DOCUMENTS

| | | |
|---|---|---|
| CN | 102982156 A1 | 3/2013 |
| CN | 102999619 A1 | 3/2013 |
| WO | 2009137292 A2 | 11/2009 |
| WO | 2012152867 A1 | 11/2012 |
| WO | 2013043230 A1 | 3/2013 |

OTHER PUBLICATIONS

Ogg, Erica., "Why App Store Search (Still) Needs to be Fixed", Retrieved at «http://gigaom.com/2012/11/15/why-app-store-search-still-needs-to-be-fixed/», Nov. 15, 2012, pp. 6.

Kim, et al., "Personalized Ranking of Search Results with Learned User Interest Hierarchies from Bookmarks", Retrieved at «http://citeseerx.ist.psu.edu/viewdoc/download?doi=10.1.1.62.6376&rep=rep1&type=pdf», In Proceedings of the 7th International Conference on Knowledge Discovery on the Web: Advances in Web Mining and Web Usage Analysis, Aug. 21, 2005, pp. 10.

Vallet, et al., "Personalized Diversification of Search Results", Retrieved at «http://ir.ii.uam.es/predict/pubs/sigir12-vallet.pdf», In Proceedings of the 35th International ACM SIGIR Conference on Research and Development in Information Retrieval, Aug. 12, 2012, pp. 10.

Dou, et al., "A Large-scale Evaluation and Analysis of Personalized Search Strategies", Retrieved at «http://www2007.org/papers/paper495.pdf», In Proceedings of the 16th International Conference on World Wide Web, May 8, 2007, pp. 10.

Carmel, et al., "Personalized Social Search Based on the User's Social Network", Retrieved at «http://129.34.20.3/haifa/dept/imt/papers/carmelCIKM09.pdf», In Proceedings of the 18th ACM Conference on Information and Knowledge Management, Nov. 2, 2009, pp. 10.

Spoerri, Anselm., "Visual Mashup of Text and Media Search Results", Retrieved at «http://ieeexplore.ieee.org/stamp/stamp.jsp?tp=&arnumber=4271985», In 11th International Conference on Information Visualization, Jul. 3, 2007, pp. 6.

Pitkow, et al., "Personalized Search", Retrieved at «http://www.cond.org/p50-pitkow.pdf», In Communications of the ACM, vol. 45, Issue 9, Sep. 2002, Pages.

IDOL Universal Search, Retrieved at «http://www.autonomy.com/content/Products/idol-universal-search/index.en.html», Retrieved Date: Mar. 7, 2013, pp. 2.

Rowe, Matthew., "Applying Semantic Social Graphs to Disambiguate Identity References", Retrieved at »http://people.kmi.open.ac.uk/rowe/files/mrowe-eswc-09.pdf», In the 6th European Semantic Web Conference on The Semantic Web: Research and Applications, May 31, 2009, pp. 15.

Configuring Clustering in Search Results, Retrieved at «http://docs.oracle.com/cd/E21698_01/admin.1122/e21605/results003.htm», Retrieved Date: Mar. 7, 2012, pp. 5.

Zhang, et al., "Semantic, Hierarchical, Online Clustering of Web Search Results", Retrieved at «http://pdf.aminer.org/000/048/535/semantic_hierarchical_online_clustering_of_web_search_results.pdf», In Advanced Web Technologies and Applications, 6th Asia-Pacific Web Conference, Apr. 14, 2004, pp. 10.

Duda, et al, "AJAX Crawl: Making AJAX Application Searchable", IEEE International Conference on Data Engineering, pp. 78-89, 2009, IEEE.

Apple Launches iPhone 4S, iOS 5 and iCloud, http://www.apple.com/pr/library2011/10/04Apple-Launches-iPhone-4S-iOS-5-iCloud/html, dated Sep. 20, 2015, 2 pages.

Baidu to Establish New Independent Company to Provide Online Video, http://ir.baidu.com/phoenix.zhtml?c=188488&p=irol-newsArticle&ID=1371384, dated Sep. 30, 2015, 2 pages.

Baidu.com, Inc. (NASDAQ:BIDU). CNAnalyst.com, http://www.cnanalyst.com/baidu.html, dated Sep. 30, 2015, 7 pages.

Get a List of Siri Commands Directly from Siri, OSXDaily, http://osxdaily.com/2013/02/05/list-siri-commands/, dated Feb. 5, 2013, 16 pages.

Google Search Appliance, Guide to Software Release 7.0, dated Sep. 2012, 10 pages.

Google Video Search Live, dated Jan. 25, 2005, 5 pages.

Google Operating System, Unofficial news and tips about Google, http://googlesystem.blogspot.in'2007/12google-videos-redesigned-homepage.html, dated Dec. 14, 2007, 1 page.

Core Data Spotlight Integration Programming Guide, dated Jul. 23, 2012, 20 pages.

Record-Level Indexing, http://developer.apple.com/library/mac/documentation/Cocoa/Conceptual/SpotlightCoreData/Articles/recordLevel.html, retrieved Feb. 22, 2016, 12 pages.

Feldmann, et al., "Enabling Seamless Internet Mobility", In Proceedings of 16th IEEE Workshop on Local and Metropolitan Area Networks, Sep. 3, 2008, 6 Pages.

Hinze, et al., "Event-Based Applications and Enabling Technologies", In proceedings of the Third ACM International Conference on Distributed Event-Based Systems, Jul. 6, 2009, 15 Pages.

"Introducing Zoho 'Actionable' Search", Retrieved From: https://www.zoho.com/general/blog/introducing-zoho-actionable-search.html, Jun. 1, 2010, 15 Pages.

"International Search Report & Written Opinion for PCT Patent Application No. PCT/US2013/060726", dated Jan. 8, 2014; Filed Dated: Sep. 19, 2013, 10 pages.

"International Search Report & Written Opinion for PCT Patent Application No. PCT/US2013/060725", dated Jan. 8, 2014; Filed Date: Sep. 19, 2013, 11 pages.

(56) References Cited

OTHER PUBLICATIONS

"International Search Report & Written Opinion for PCT Patent Application No. PCT/US2013/060966", dated Jan. 30, 2014; Filed Date: Sep. 20, 2013, 9 pages.
Written Opinion for PCT/US2013/060754, dated Mar. 2014.
International Search Report for PCT/US103/060754, dated Mar. 3, 2014, 5 pages.
International Search Report for PCT/US2013/061068, dated Apr. 4, 2014, 4 pages.
Written Opinion for PCT/US2013/061068, dated Apr. 11, 2014, 5 pages.
International Search Report for PCT/US2013/060749 dated Apr. 17, 2014, 4 pages.
Written Opinion for PCT/US2013/060749, dated Apr. 28, 2014, 5 pages.
"Second Written Opinion Issued in PCT Application No. PCT/US2013/060749", dated Dec. 18, 2014, 6 Pages.
"Second Written Opinion Issued in PCT Application No. PCT/US2013/061068", dated Dec. 19, 2014, 7 Pages.
"International Preliminary Report on Patentability" for PCT/US2013/060749, dated Aug. 20, 2015; 7 pages.
International Preliminary Report on Patentability for PCT/US2013/061068 (MS 338745.02—now abandonded) European Patent Office, dated Aug. 24, 2015, 16 pages.
"International Preliminary Report on Patentability" for PCT/US2013/060966, dated Dec. 10, 2015; 7 pages.
"International Preliminary Report on Patentability" for PCT/US2013/060725, dated Dec. 10, 2015; 8 pages.
"International Preliminary Report on Patentability" for PCT/US2013/060726, dated Dec. 10, 2015; 8 pages.
"International Preliminary Report on Patentability" for PCT/US2013/060754, dated Dec. 10, 2015; 6 pages.
"Non-Final Office Action Issued in U.S. Appl. No. 14/011,979", dated Nov. 19, 2014, 18 Pages.
"Final Office Action Issued in U.S. Appl. No. 14/011,979", dated Mar. 5, 2015, 20 Pages.
"Non-Final Office Action Issued in U.S. Appl. No. 14/012,117", dated May 13, 2015, 12 Pages.
"Non-Final Office Action Issued in U.S. Appl. No. 14/012,039", dated May 22, 2015, 17 Pages.
"Non-Final Office Action Issued in U.S. Appl. No. 14/012,234", dated Jul. 2, 2015, 33 Pages.
"Non-Final Office Action Issued in U.S. Appl. No. 14/012,359", dated Jul. 2, 2015, 21 Pages.
"Non-Final Office Action Issued in U.S. Appl. No. 14/011,979", dated Jul. 17, 2015, 17 Pages.
"Final Office Action Issued in U.S. Appl. No. 14/012,117", dated Sep. 16, 2015, 11 Pages.
"Final Office Action Issued in U.S. Appl. No. 14/012,039", dated Dec. 10, 2015, 16 Pages.
"Non-Final Office Action Issued in U.S. Appl. No. 14/012,039", dated Jun. 3, 2016, 16 Pages.
"Final Office Action Issued in U.S. Appl. No. 14/012,039", dated Oct. 18, 2016, 20 Pages.
"Final Office Action Issued in U.S. Appl. No. 14/011,886", dated Apr. 10, 2017, 19 Pages.
"Office Action Issued in Chinese Patent Application No. 201380077015.1", dated Mar. 20, 2018, 7 Pages. (W/o English Translation).
"Office Action Issued in Chinese Patent Application No. 201380076971.8", dated May 28, 2018, 11 Pages. (no new refs cited).
"Office Action Issued in European Patent Application No. 13776606.9", dated Aug. 8, 2018, 7 Pages. (no new references cited).
"Non Final Office Action Issued in U.S. Appl. No. 15/298,106", dated Sep. 21, 2018, 19 Pages.
"Office Action Issued in European Patent Application No. 13774547.7", dated Oct. 2, 2018, 5 Pages.
"Second Office Action and Search Report Issued in Chinese Patent Application No. 201380077015.1", dated Dec. 13, 2018, 12 Pages.
"Notice of Allowance Issued in U.S. Appl. No. 14/011,886", dated Dec. 17, 2018, 11 Pages.
"Second Office Action Issued in Chinese Patent Application No. 201380076971.8", dated Feb. 15, 2019, 09 Pages.
"Final Office Action Issued in U.S. Appl. No. 15/298,106", dated Mar. 8, 2019, 16 Pages.
"Oral Hearing Issued in European Patent Application No. 13776606.9", dated Apr. 2, 2019, 8 Pages.
Third Office Action and Search Report Issued in Chinese Patent Application No. 201380076971.8, dated Jul. 2, 2019, 18 Pages.
Third Office Action and Search Report Issued in Chinese Patent Application No. 201380077015.1, dated Jul. 24, 2019, 15 Pages.
"Office Action Issued in European Patent Application No. 13774547.7", dated Jun. 10, 2020, 4 Pages.
Bott, et al, Microsoft Windows XP Inside Out, In Microsoft Windows XP Inside Out, Jan. 1, 2005, 5 Pages.
"Final Office Action Issued in U.S. Appl. No. 14/012,039", dated Mar. 26, 2021, 20 Pages.
"Non Final Office Action Issued in U.S. Appl. No. 14/012,039", dated Sep. 16, 2020, 18 Pages.
"Fourth Office Action Issued in Chinese Patent Application No. 201380077015.1", dated Mar. 19, 2020, 10 Pages.
"Final Office Action Issued in U.S. Appl. No. 14/012,039", dated Jun. 17, 2021, 22 Pages.
"Office Action Issued in Chinese Patent Application No. 201380076971.8", dated Sep. 26, 2021, 18 Pages.

* cited by examiner

CONTEXT-BASED ACTIONS FROM A SOURCE APPLICATION

CROSS-REFERENCE TO RELATED APPLICATIONS

The present application is a continuation of and claims benefit of U.S. patent application Ser. No. 15/298,106, filed Oct. 19, 2016 titled "CONTEXT-BASED ACTIONS FROM A SOURCE APPLICATION" which is a continuation of U.S. patent application Ser. No. 14/011,886, filed Aug. 28, 2013 titled "CONTEXT-BASED ACTIONS FROM A SOURCE APPLICATION," which claims benefit of priority to U.S. Provisional Patent Application No. 61/828,535, entitled "Context-based Actions from Search Results" filed on May 29, 2013, which is specifically incorporated by reference for all that it discloses and teaches.

The present application is also related to abandoned U.S. Nonprovisional patent application Ser. No. 14/011,979 filed 28 Aug. 2013 and entitled "Application Installation from Search Results;" U.S. Nonprovisional patent application Ser. No. 14/012,039 filed 28 Aug. 2013 and entitled "Search Result Contexts for Application Launch;" abandoned U.S. Nonprovisional patent application Ser. No. 14/012,117 filed 28 Aug. 2013 and entitled "Application Content Search Management;" abandoned U.S. Nonprovisional patent application Ser. No. 14/012,234 filed 28 Aug. 2013 and entitled "Personalized Prioritization of Integrated Search Results;" and abandoned U.S. Nonprovisional patent application Ser. No. 14/012,359. filed 28 Aug. 2013 and entitled "Integrated Search Results," all of which are specifically incorporated herein by reference for all that they disclose and teach.

BACKGROUND

A user's experience using search features in a computing environment can be rather limited in scope, functionality, and presentation. For example, a user may perform independent searches in different contexts, such as a search for a local file, object, or application through a file system search feature, another independent search for an email in a separate email application search feature, yet another independent search for Web content using a separate Web search service, etc. Results from such different contexts of searches are generally provided independently, with independent rankings and groupings, in presentations by separate applications and/or in separate windows and formats, etc. Accordingly, such searches fail to provide integration among the different contexts of search results.

In addition, a user's options for interacting with search results or other content elements are also limited. For example, a user can select a file system search result to find a file associated with an application and then select the file to invoke the application. Alternatively, a user can select a Web search result (e.g., in the form of a link) in a browser to navigate to the Web page associated with the search result. Existing search result solutions fail to offer a user experience that presents a rich set of appropriate actions for operating on a search result (e.g., playing a video specified by a search result, opening an application corresponding to a local or Web-resident database associated with the application, etc.).

SUMMARY

Implementations described and claimed herein address the foregoing problems by providing context-based actions in association with a source application. The source application detects selection of a content element presented by the source application. The content element is associated with an application identifier identifying a target application and an action identifier identifying an operation to be executed by the target application on the content element. The target application identified by the application identifier is executed to perform the operation identified by the action identifier on the content element, responsive to detection of the selection of the content element.

In another implementation, the source application is a search feature providing different contexts of search results (e.g., from a local file system search, a local application content search, a Web search, a remote application content search). A search management system receives one or more search results from a search operation based on a search query. At least one of the search results is associated with an application identifier identifying an application and an action identifier identifying an operation to be executed by the application on content identified by the at least one search result. The search management system receives a selection of a search result of a search result via a user interface. A contextual application launcher executes the application identified by the application identifier to perform the operation identified by the action identifier on the content identified by the selected search result, responsive to detection of the selection of the search result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The described technology is explained using both an action-related search scenario and a more generic action framework scenario. The action framework scenario is based on invoking an action from a source application by selecting a content element presented by the source application, the action being performed by a target application. The action-related search scenario is directed to a source application related to local and/or remote search operations, but the action framework may be applied to many other specific scenarios, including without limitation calling a selected phone number from a contacts record, playing a song from a playlist, composing an email to a selected email address in a received email, etc.

Figure 1:
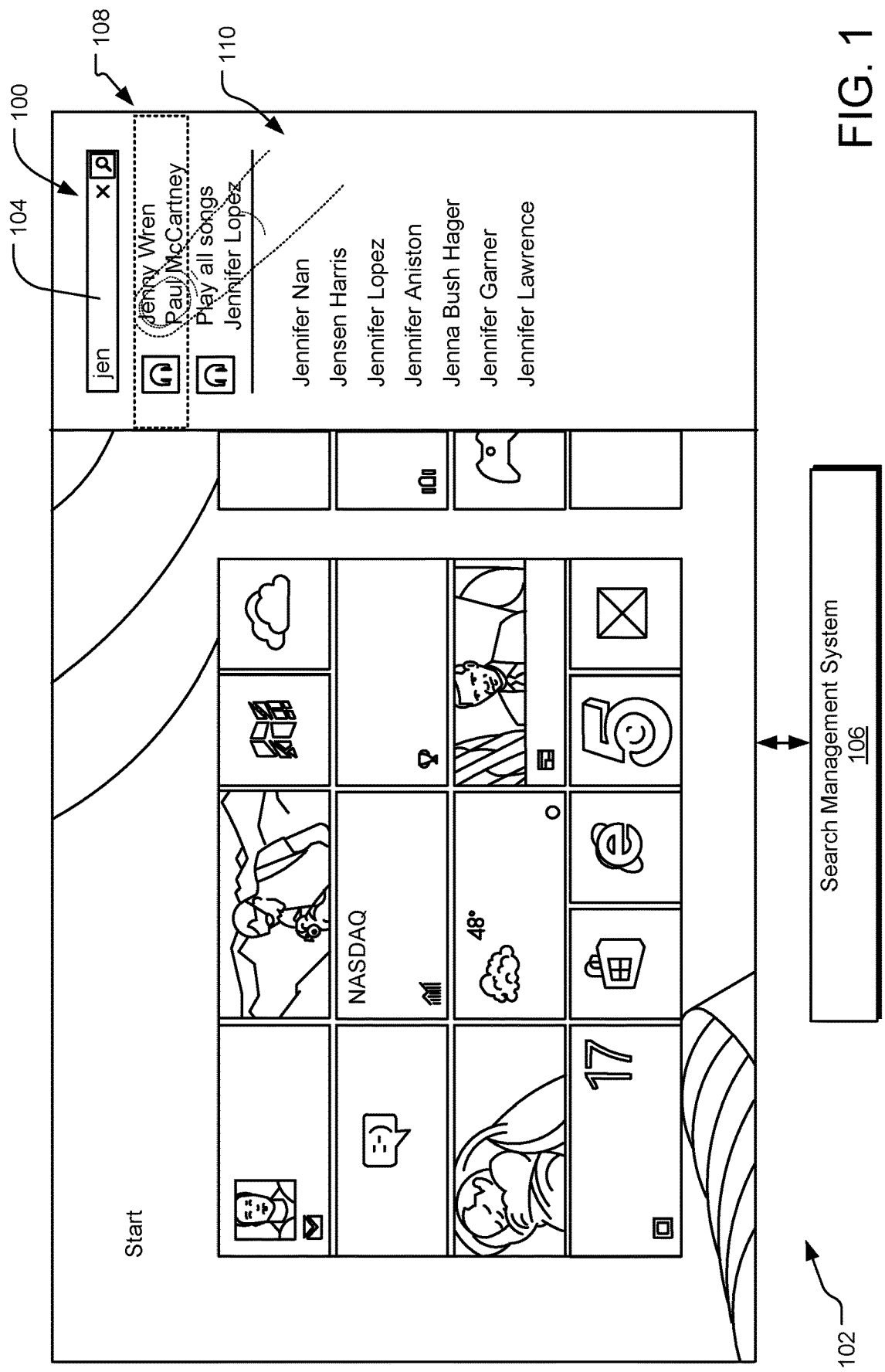
FIG. 1 illustrates an example search feature provided in a computing environment.

FIG. 1 illustrates an example search feature 100 provided in a computing environment 102. The search feature 100 includes a search field 104 managed by a search management system 106 (an example source application). A user can enter a search query or a portion thereof (e.g., "jen") into the search field 104 to invoke a multiple context search. Text representing a fully-entered search query, a portion thereof, and a fully-formulated search query for submission to a search facility are all referred to as a "search query." In various implementations, for example, one search context may include a "local content" search, such as a search of files, objects, applications, and other data accessible locally on the user's computing system or within a local area network (LAN). Such local content may also include files, objects, applications, and other data synchronized between the local computing system and cloud storage. Another search context may include a "remote content" search, such as a search of files, objects, applications, and other data accessible from within a wide area network (WAN), such as the Internet or the Web. Example remote content may include content accessible by Web search engines, such as Web pages, archives, Web services, etc.

Yet another search context may include an "application content" search, such as a search of data accessible specifically through an enumerated application or a set of enumerated applications executable by a user's computing system or a local server (whether or not the application is already installed on the user's computing system). For example, a music player application on the user's computing system may provide enhanced access to audio data accessible locally or remotely. Such enhanced access may include functionality for playing the audio file, aggregating supplemental data from other sources (e.g., album art work, artist biographical data, access to preview and purchase the artist's work, etc.). If the application is not yet installed on the user's computing system, the search management system or related sub-systems may offer to install the application for use in accessing the content associated with the search result. In one implementation, an application that can access the application content is identifiable by an application identifier that uniquely identifies the target application within an application store or catalog, within a database of otherwise installable applications (e.g., via download or removable media), etc. It should be understood that certain application content may be accessible via multiple uniquely identified applications, such as in the case of several specifically-identified music player applications being able to operate on (e.g., playback) a particular music library. It should be understood that non-application content refers to local or remote content that is not accessible via an enumerated application, such as remote Web content or local file content that is not specified for access via an enumerated application designated by an unambiguous application identifier.

In another example, a search result referencing a contact (a type of local content, such as from a contacts application or file, or remote content, such as from a social networking service database or CRM system) may be returned as a search result. Content elements (e.g., actionable sub-components of the contact search content) may be presented with certain instrumentation to allow a user to select the content element (e.g., an "entity property"), such as a phone number or an email address within the contact content, to invoke the associated action (e.g., making a call to the phone number or composing an email to the email address) via a target application.

It should be understood that various search contexts may be performed locally or remotely. For example, an application search context may be performed on locally accessible application content. Such application content resides locally to the user's computing system and is associated with an enumerated application executable on the user's computing system. Likewise, an application search context may be performed on remotely accessible application content. Such application content resides external to the user's computing system and yet is still associated with an enumerated application executable on the user's computing system.

Other content from the search result content may also be used in invoking the action. For example, if a restaurant search result is returned based on entry of a date and time in the search query, the date and time may be included in the subject line or body of a new email, responsive to selection of the email address of the restaurant as returned in the search result.

Other search contexts and actions may be supported in other implementations.

The search management system 106 integrates searches in such contexts to allow a user to perform a single search, rather than a series of independent searches, and obtain an aggregated ranking, grouping, and presentation of the integrated search results. The search handling system also processes contextual metadata in association with such search results to allow the user's computing system to perform actions in response to selection of individual search results (e.g., launching an appropriate audio player to play an audio file corresponding to a search result). Example metadata may include one or more application identifiers, one or more action identifiers, etc.

In the illustrated implementation, as the user types each letter of the search query into the search field 104, the search management system 106 progressively searches through the various supported search contexts (e.g., local content, remote content, application content, etc.) based on the entered portion of the search query and presents progressive search results 108 (e.g., a song called "Jenny Wren" by Paul McCartney and various songs by Jennifer Lopez) and search query suggestions 110 (e.g., "Jennifer Nan," "Jensen Harris," etc.). In the case of the search results 108, the song files may be found in one or more of the local content, remote content, and application content search contexts.

The search management system 106 receives the search query or portion thereof (collectively referred to as the "search query" unless specified more specifically) and serves the search query to a local search provider and/or a remote search provider. The local search provider, for example, may be a search facility resident in the client or within the local area network that allows the user to search for files, objects, applications, etc. within the file system of the client device, client-accessible servers and storage devices, and other local datastores (e.g., a local image, video or audio database; a local inventory database, a local personnel database etc.). In contrast, the remote search provider, for example, may be a WAN-resident search facility, such as a Web search engine, that allows the user to search Web domains, online databases, and other remote resources. One or both of the search providers return search results based on the search query to the search management system 106, which passes the search results to the user interface for integrated presentation to the user.

In FIG. 1, a user is shown selecting the search result pertaining to Paul McCartney's Jenny Wren audio file (as shown by an outline of the user's finger against a touch screen), which is associated with context metadata indicating the context of the search result (e.g., an application identifier for an application and an associated action, e.g., "play," to be used with the search result content). For example, in the case of the selected audio file, the search result is associated with context metadata indicating an application identifier for a music player application that can be executed on the client device (see the discussion of FIG. 2).

As previously discussed, an application content search performs a search through content accessible via an application executable by the user's computing system. For example, a media player application on the user's computing system may have access to local audio files, Web-resident audio files, streaming music channels, etc. In one implementation, a search of at least one index of such application content may be achieved via the search field 104 and the search management system 106. It should be understood that the specific application used to access the application content need not be installed or executing on the user's computing system at the time of the search operation (or at the time of the selection of a content element of a source application in the more general perspective). Instead, if the enumerated application is available (e.g., via an online application store or via another installation method), the search result may indicate the appropriate application to be used to access the application content, in some cases offering to install the application, offering to allow the user to purchase and install the application, directing the user to otherwise obtain and install the application, etc.

Further, one or more search engines (e.g., the search management system 106, a Web-based search engine or service, etc.) can return contextualized search results that can be interpreted by the search management system 106 to provide enhanced presentation (e.g., prioritization, grouping, personalization, etc.) and functionality (automatic launching of appropriate applications, automatic invocation of appropriate actions, etc.).

Figure 2:
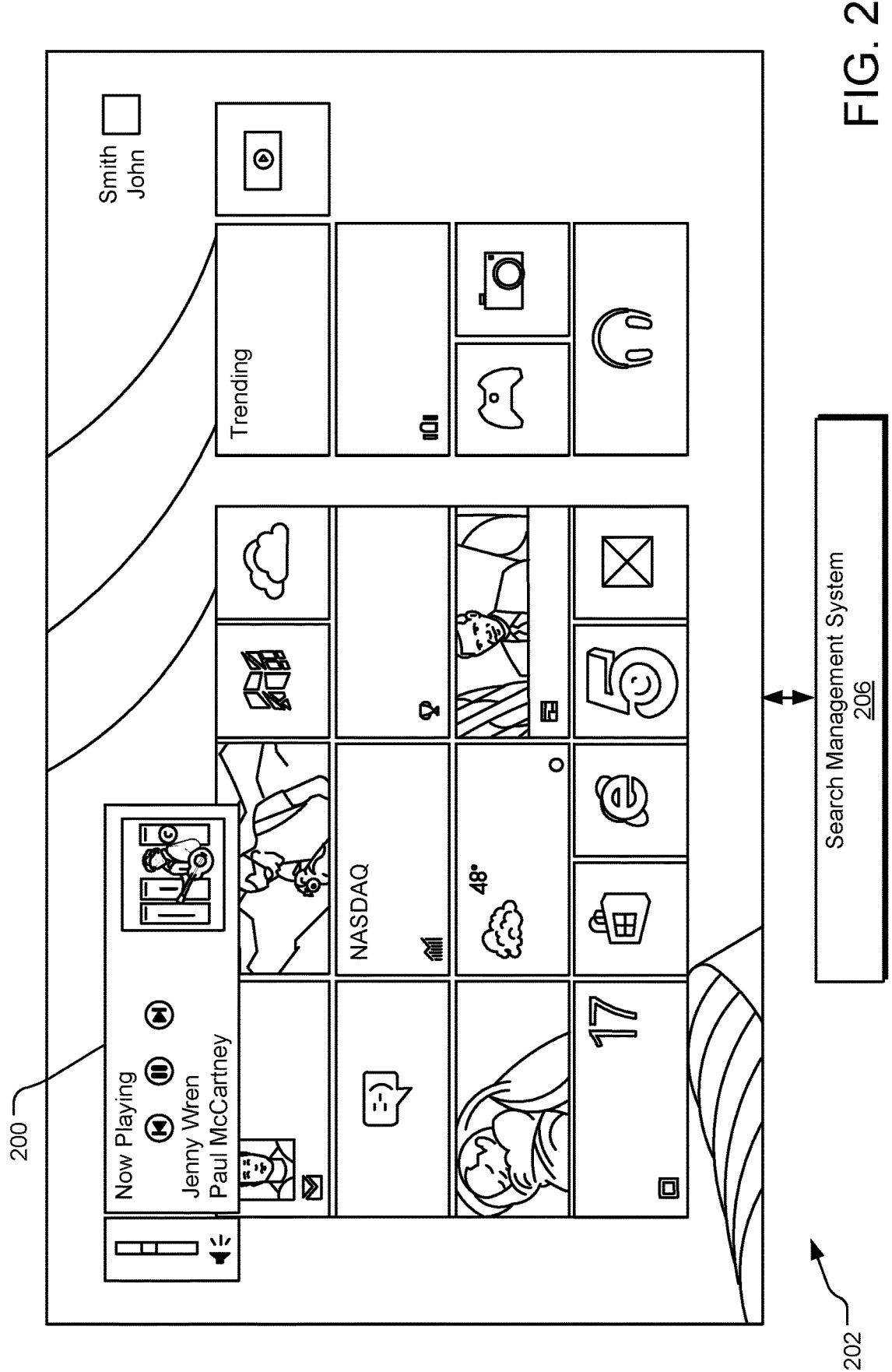
FIG. 2 illustrates an example action invoked based on selection of a search result in a computing environment.

FIG. 2 illustrates an example action invoked based on selection of a search result in a computing environment 202. Responsive to selection of a contextualized search result from a list of search results, a search management system 206 launches an appropriate media player application 200 and initiates a "play" action to initiate playing of the audio file referenced by the selected search result. In one implementation, the launch of the appropriate media player and the initiation of the "play" action within the media player are performed based on contextual information provided in association with the search result, absent subsequent or intervening user interface input between the selection of the search result and the initiation of the "play" action.

Example contextual information may include a unique application identifier, a search result descriptor providing a schema describing the data reference by the search result (e.g., identifying the data as an audio file of MPEG4 format in association with a "play" action), etc. The contextual information may also include a variety of other information including licensing information, purchase transaction information, an address for buying/installing a specified application to operate on the data identified by the search result, crowd-sourced application settings, crowd-sourced information for supplementing the search result (e.g., crowd-sourced playlists, crowd-sourced album artwork, crowd-sourced associated media, etc.).

Figure 3:
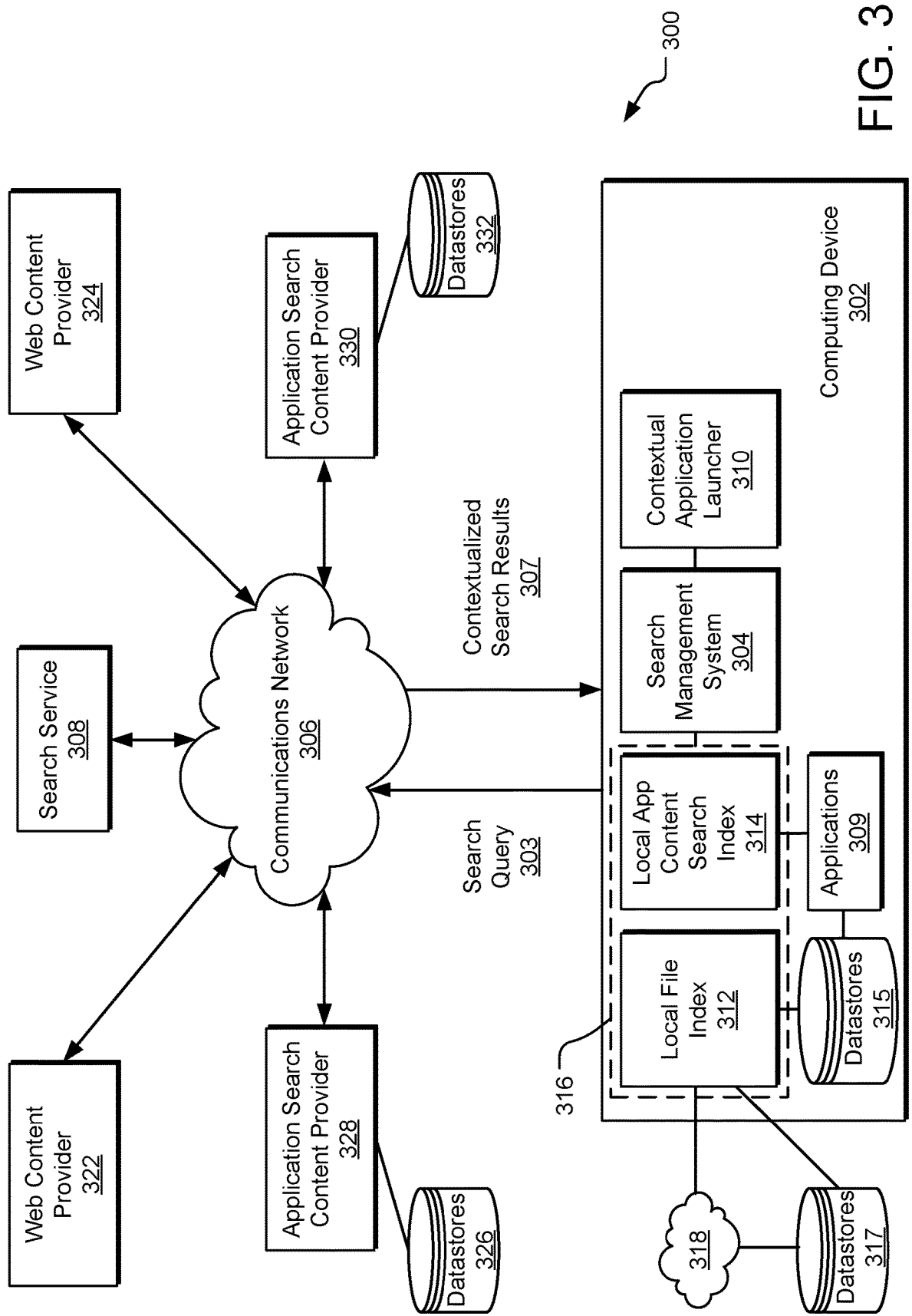
FIG. 3 illustrates an example computing system for providing context-based actions from search results.

FIG. 3 illustrates an example computing system 300 for providing context-based actions from search results. A computing device 302 includes a search management system 304 that manages integrated search for the computing device 302. In one implementation, the search management system 304 is a component of an operating system executing on the computing device 302, although in other implementations, the search management system may be a stand-alone application or a remote service.

The search management system 304 receives a search query 303 (e.g., via a user interface), processes it and passes it through a communications network 306 (e.g., the Web) to a search service 308, receives contextualized search results 307 from the search service 308, and returns, via a search results interface, one or more contextualized search results from a variety of search contexts (e.g. Web searches, application content searches, etc.). An example search results interface includes a web server supporting the search service 308, or some other communication system for communicating search results to searching entities. In one implementation, the search service 308 acts as a central broker that receives and processes the search query 303 from the search management system 304, integrates all cloud-based content (e.g., from providers 322, 324, 328, 330), and returns the contextualized search results 307 (pertaining to remote Web and application content) to the search management system 304.

The search management system 304 also performs local searches and/or local application content searches. In one implementation, the search management system 304 integrates local searches, Web searches, and application content searches, prioritizing results from each context using rankings computed across the three contexts, and, when appropriate, presenting the results through a user interface in an integrated display (e.g., in the same search result window, with search results from each context intermixed with search results from other contexts).

In other implementations, selection of a search result may trigger an action within an application (see applications 309) that operates on the content associated with the search result content. For example, as shown with regard to FIGS. 1 and 2, selection of a song from a search results list invokes a "play" action within a music player application. Launching of the appropriate application and activation of the action may be facilitated by contextualized search results, both from the search service 308 and from local content and local application content searches performed on the computing device 302. In one implementation, the contextualized search results include an application identifier and an action identifier. For example, the application identifier may specify a unique application available for installation and execution on the computing device 302. The unique application is identified as being appropriate for execution on the search result content. The action identifier specifies the action to be taken by the application on the search result content. A contextual application launcher 310 processes the application identifier and the action identifier to perform the specified action on the search result content using the specified application.

In the context of local searches, the search management system 304 collects and/or generates one or more local indexes (e.g., a local file index 312 and a local application content search index 314), which may be integrated into a single local index 316. For example, the local file index 312 represents a collection of scanned (e.g., crawled) and parsed data from local files for use in identifying search results satisfying a search query. In contrast, a local application content search index 314 represents a collection of parsed data from an application database or other application content datastore. Such parsed data may be obtained by scanning (e.g., crawling) the database or other datastore associated with the application (collectively referred to as "application datastores 315") directly or by scanning (e.g., crawling) the application datastore via an API or other mechanism for accessing the application's data. The scanned data is parsed into the local application content search index 314. The local file index 312 and local application content search index 314 may be integrated (e.g., its indexes combined) in real time, periodically, responsive to changes in the searchable data, responsive to receipt of a search query, etc. It should be understood that the local file index 312 may also include data from other locally accessible datastores 317, such as shared storage systems, external hard drives, virtual storage systems, etc., whether connected directly to the computing device 302 or connected via a communications network 318.

Figure 4:
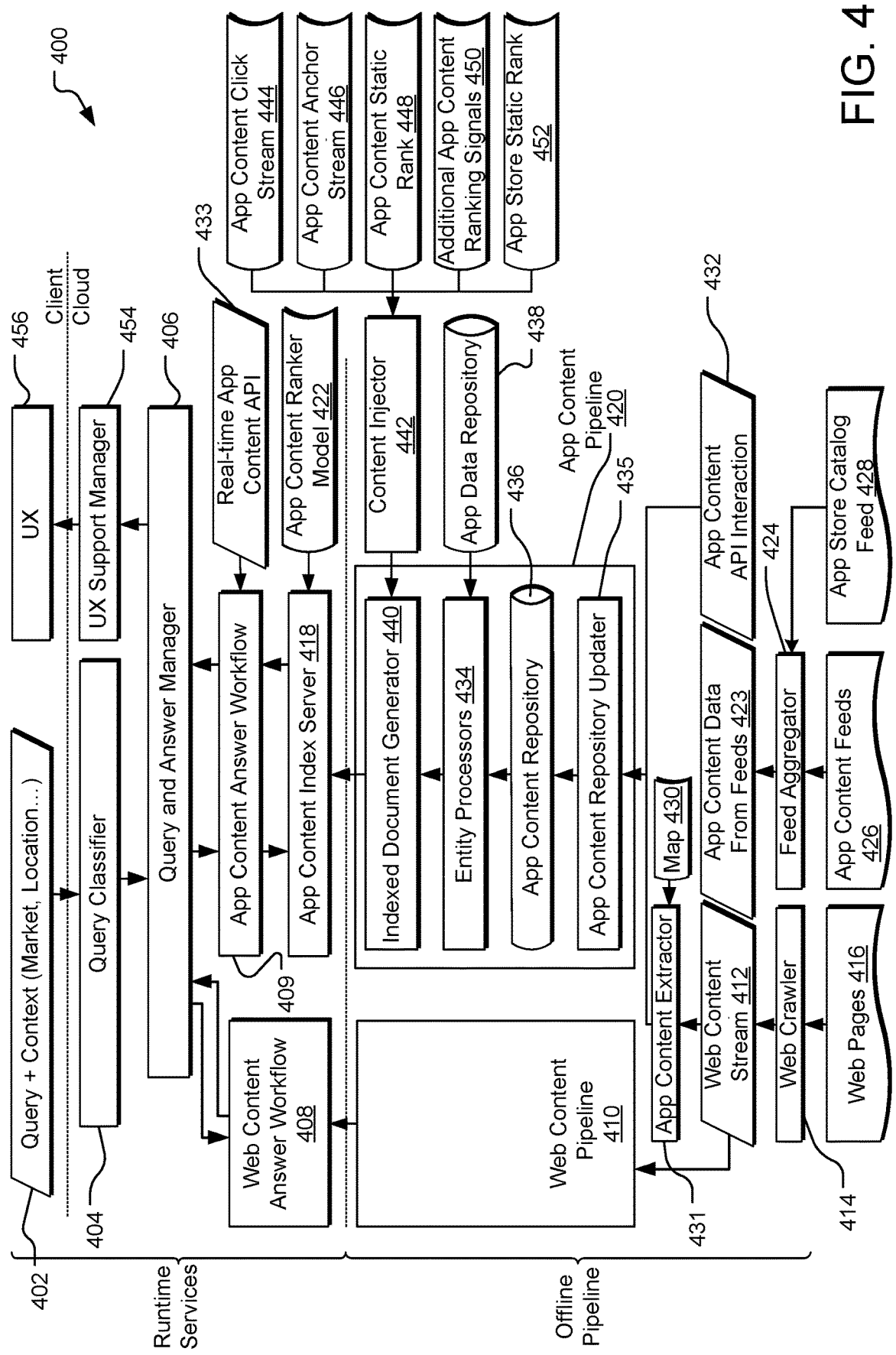
FIG. 4 illustrates an example computing architecture for providing context-based search results.

The local file index 312 and local application content search index 314 may be generated using methods and systems similar to those illustrated and described with regard to remote content in FIG. 4. Likewise, the local search management system 304 may manage search results (e.g., ranking, grouping, and instrumenting merged local and remote search context results) in a manner similar to that illustrated and described with regard to remote content in FIG. 4. It should also be understood that, in some implementations, the search system can fall back and directly access contents of local resources if the local file index 312 and/or the local application content search index 314 are not available or complete at the time of the query.

The search service 308, which can represent a collection of search services, crawls remotely accessible datastores and content from other sources to generate a searchable index. Responsive to receipt of a search query, the search service 308 analyzes its searchable index and returns contextualized search results 307. The searchable index may be generated from the scanning and parsing of Web pages (such as those provided by Web content providers 322 and 324), datastores containing application content (such as application search content datastore 326 provided by an application content provider 328 and an application search content datastore 330 provided by an application content provider 332), and other content sources. In one implementation, an application search content provider may generate its own index of its content and make it available to the search service 308. In another implementation, an application search content provider may provide an API or other mechanism to allow the search service 308 or another entity to access the provider's content for generation of an index that may be accessed by the search service 308. In yet another implementation, a content provider may periodically upload structured content data to the search service 308 using a mechanism such as an XML RSS feed.

The search service 308 transfers the contextualized search results 307 to the search management system 304 for integration and presentation with local search results. The search management system 304 also generates a local set of contextualized search results. Each set of contextualized search results may include a variety of search result context parameters. Examples of such context parameters are listed below, without limitation:

Application identifier—specifies an application to be executed on the content specified by the search result (e.g., an application identifier may be a unique identifier specified in an application store catalog, a publicly available database, etc.)

Action identifier—specifies an action to be performed by an associated application on the content specified by the search result (e.g., "play", "mail", "message", "call", etc.); may also be referred to as an "action contract" or as a parameter of an "action contract"

Ranking parameters—specify the ranking of a search result with regard to other returned search results; such ranking parameters may also include sub-rankings to facilitate the integration of remote ranking with local rankings Grouping parameters—specify categories of content with which a particular search result should be grouped within a search result window Personalization parameters—specify ranking and grouping parameters particular to the searching user (e.g., a remote movie application is aware that the user associated with a particular account prefers action movies, so the personalization parameter specifies an enhanced weighting on such movies when returning movie-related search results)

Aggregated user interaction parameters—specify adjustments to ranking and grouping parameters based on click stream data received from multiple users (e.g., if users are statistically clicking search results from one data source or for one entity more frequently than another, this aggregated interaction may emphasize the search results from that data source or for that entity over other search results)

Accordingly, the contextualized search results 307 (e.g., which may include search results associated with remote content, e.g., Web content, and remote application content) and contextualized search results generated by the search management system 304 (e.g., which may include search results associated with local content, e.g., local files, and local application content accessible by locally executable applications) are ranked in aggregate and presented through a user interface in an integrated format (e.g., a single search results window). Furthermore, selection of a search result may result in a launch of an associated application (e.g., specified by a contextually-provided application identifier) and invocation of an associated action (e.g., specified by a contextually-provided action identifier), such as "play the audio content associated with the selected search result."

It should also be understood that the search management system 304 can operate as an application content provider, in that the application content it accesses through applications 309 may be Web-based datastores (rather than local datastores). The remote content or an index associated with the remote content accessible though the applications 309 may be therefore be served up to the search service 308 to supplement the index search content available to the search service 308.

In one implementation, action identifiers coordinated with or selected from a standardized set of action identifiers agree upon by application owners/publishers, operating system vendors, search system vendors, and/or Web page designers. The action identifiers may be hard-coded, parsed from Web pages, received via a feed, accessed via an API, etc. In this manner, intended actions can be accurately communicated to applications so that providers can enhance the richness of the user experience when interacting between different applications, data sources, and services. Action identifiers may also be self-registered with a service to allow crowd-sourcing of the action identifier set.

It should be understood that search results from various search contexts and classifications may alternatively be presented in separate views, rather than an integrated view. For example, application content search results may be presented in one window and local search results may be presented in another window. In another example, the different types of search results may be presented in a single window that allows a user to toggle through the different search contexts or classifications.

FIG. 4 illustrates an example computing architecture 400 for providing context-based search results. A query 402 includes a search query (or portion thereof), along with possible context information (e.g., marketing information, location information, safe search setting, privacy settings, personalization information, etc.). The query 402 may be considered a generic query, in that it is not limited to Web search results or application content search results. Instead, the query 402 input from a client (e.g., through a search application or facility in the client) to a query classifier 404 in a cloud computing environment. The query classifier 404 analyzes the query 402, assigns (e.g., tags) one or more classifications to the query 402 (e.g., application content query, celebrity query, music query, top ten thousand query, navigational query, etc.) along with appropriate confidence metrics, and passes the classified query to a query and answer manager 406. The classification tags may be used to influence rankings among search results from one or more search contexts. The classification tags may also be used by the query and answer manager 406 as well as other components in the search framework to determine which answer services and content providers should be queried based on the classified search query.

In yet another implementation, the classification tags may be used to disambiguate search results, thereby grouping, ranking, and filtering search results to provide a more relevant set of search results to the user. For example, a query may be tagged to pertain to "Michael Jackson" the musician rather than "Michael Jackson" the whisky expert. As such, search results returned about the whisky expert may then be ranked lower, grouped in a different region of the user interface, filtered out altogether, etc.

Classification tags may also be used to, without limitation:
- determine whether to submit a classified query to a particular answer workflow (e.g., Web content answer workflow 408, application content answer workflow 409, etc.);
- filter, rank, promote, demote, etc. search results within the application content answer workflow 409 and related components; and
- aggregate and/or merge results from various answer workflows (e.g., Web content answer workflow 408, application content answer workflow 409, etc.) in the query and answer manager 406.

The query and answer manager 406 receives the classified query and directs it to one or more appropriate answer workflows, such as the Web content answer workflow 408 or the application content answer workflow 409. Other answer workflows may also be employed, such as a multimedia content answer workflow, an ads workflow, etc.

In one example, the classified query is passed to a Web content answer workflow 408, which applies the classified query to output of a Web content pipeline 410 as a run-time service. On a substantially continuous basis, the Web content pipeline 410 receives and indexes a Web content stream 412 from a Web crawler 414. The Web crawler 416 analyzes Web pages 416 and provides the crawled Web content stream 412 to the Web content pipeline 410, which indexes and otherwise processes the Web content to make the indexed Web content available to the Web content answer workflow 408. The Web content answer workflow 408 applies the received classified query to the indexed Web content of the Web content pipeline 410 and provides the query and answer manager 406 with ranked and/or otherwise contextualized search results from the Web content.

In another example, the classified query is passed to an application content answer workflow 409, which works with an application content index server 418 to apply the classified query to indexed application content output received from an application content pipeline 420. The application content pipeline 420 processes data from various application content sources, including without limitation the Web content stream 412, the application content from feeds 423, and application content API interaction 432. Such content can be organized in a variety of ways, including without limitation by canonical entity and by content identifier. For example, when organized by canonical entity, content from various sources are matched against a well-known entity like "Katy Perry" and stored relative to that canonical entity by the entity processors 434. This technique allows search results from the application content index server 418 to pull all related application content for "Katy Perry" in a single request. In one implementation, the query classifier 404 is primarily responsible for determined whether the canonical entity "Katy Perry" is the topic intended by the user. In another example, when organized by content identifier, each set of application content received from various sources is indexed into separate documents. The application content index server 418 matches relevant documents from such sources based on various signals, such as the number of terms matching, popularity of the document, popularity of the source, popularity of the application, etc.

The application content ranker model 422 provides one or more models, used by the application content index server 418, for ranking indexed application content received from the application content pipeline 420. The application content index server 418 returns to the application content answer workflow 409 a set of ranked application content documents.

In the example of the application content pipeline 420, application content is input to the application content pipeline 420 through a variety of mechanisms. One possible mechanism is through the Web Content stream 412, which (at least in the case of application content) receives crawled Web content from Web sites that are accessible through an application (e.g., a movie database that is accessible through a movie browsing and playing application) and provides structured content of the information from the associated Web pages. For certain Web pages, for example, the elements of individual pages in the Web content stream 412 are mapped to provide structured data (e.g., pictures at certain locations in the Web pages are album cover images, text at certain locations in the Web pages identify the artist, etc.) through an application content extractor 431. The Web crawler 414 fetches raw Web page content, which is fed to the Web content pipeline 410 as the Web content stream 412. The Web content stream 412 is also processed by the application content extractor 431 to generate structured data based on the mappings. The structured data is passed to the application content pipeline 420. In an alternative implementation, the application content extractor 431 can be integrated into the Web crawler 414.

The mappings are provided by one or more URL-pattern-to-application-information mapping models (see, e.g., map 430). The structured data from the Web content stream 412 is received by the app content pipeline 420 and used to generate indexed application content for use in responding to search queries. Alternatively, Web page developers can mark-up their Web pages to allow the Web crawler 414 to extract structured data from each marked-up Web page. This structured data is extracted from Web pages having content that is accessible through an unambiguous application executable on the user's system (such Web content, when input to the application content pipelines, is also referred to as a type of "application content" because it is based on Web content accessible via an identified application executable by the user's computer system.)

In another mechanism for extracting application content, a feed aggregator 424 receives structured application content 423 (e.g., in XML, format) from one or more application content feeds 426 and/or application store catalog feeds 428. The structural elements are provided through the feeds by the application content providers (e.g., the movie database provider) and/or the application stores.

In yet another mechanism for extracting application content, an application content API interaction module 432 accesses online content sources via a source-provided API. In such a mechanism, the application content API interaction module 432 queries online content sources to obtain structured data relating to the application content provided by these sources.

Each of these mechanisms, as well as other potential application content providing mechanisms, may be employed to provide structured application content data to the application content pipeline 420. Within the application content pipeline 420, an application content repository updater 435 processes the received structured application content data and updates already stored structured application content data recorded in the application content repository 436. Example updates may include without limitation supplementing, altering, or deleting portions of the application content stored in the application content repository 436. For example, a new movie may be made available through a movie service accessible through a movie player application on the client. The application content representing the new movie may be added to the application content repository 436. In contrast, a movie may have been removed from a movie service, so the application content representing the formerly-available movie may be deleted from the application content repository 436.

One or more entity processors 434 receive updated application content from the application content repository and may associate some of the content with various entities. An entity represents a semantic data object having annotated properties, such a unique identifier, a collection of properties based on the attributes of the real-world topic it represents, links representing the topic's relationship to other entities, actions that a searcher for that topic might want to invoke, etc. The entity processors 434 stamp (e.g., assign one or more unique identifiers to) components of the application content to associate it with the entities in an entity database (e.g., to associate movie content with a movie entity, with an actor entity, etc.). An application data repository 438 may include without limitation application metadata such as the application title, icon, description, etc., which may be obtained from the online application store, an application metadata service, etc. Such metadata may be used to enhance the information associated with the application content search result in its presentation via a user interface 456, for example.

An indexed document generator 440 receives stamped application content from the entity processors 434 and content characterization parameters from a content injector 442. The content injector 442 receives content characterization parameters, such as telemetry data, anchor data, ranking parameters, etc., which can be used by the indexed document generator 440 to provide rich indexed application content for use by the application content index server 418 when serving application content search results to the application content answer workflow 409. Example content characterization parameters are described below.

An application content click stream 444 collects and delivers telemetry data by tracking historical user behavior (e.g., "the click stream") when users interact with application content data and related applications themselves. An application content anchor stream 446 operates on application content collected from Web pages and collects and delivers anchor text of a selected link, text that is located in the proximity of a selected link, text that is located on Web pages referenced by the selected link, etc. In this manner, the anchor text can be mapped to certain application content and therefore used in ranking the application content. An application content static rank 448 collects and delivers static ranking information provided by other sources, such as human-generated ranking data, marketing research ranking, etc. Additional application content ranking signals 450 collects and delivers a variety of other ranking data, including without limitation view counts and user ratings associated with the application content. An application store static rank 452 collects and delivers static ranking information received from one or more online application stores, such as an online store that allows users to download and install application to their client computers for use in accessing application content. For example, if a variety of movie applications may access one or more online movie databases, ranking information from the application store static rank 452 may providing higher ranking information for the most popular of the movie applications as discerned from user purchase information through the online application store or the online movie database. It should also be understood that certain ranking data may also be provided from dynamic ranking sources.

Based on the above-described content characterization and collected application content, the indexed document generator 440 provides the indexed application data to the application content index server 418 and the application content answer workflow 409 for use in responding to the search query and ranking the application content search results. The application content answer workflow 409 may also receive real-time application content via a real-time application content API 433, which provides an alternate route for application content so that application content need not to be processed by the application content pipeline 420 for indexing and may be queried through the application content answer workflow directly. For example, a travel application may provide a real-time API to book flights from one location to another. The application content answer workflow 409 may identify a user query to match the pattern of a "book-flight" query and then call the real-time application content API 433 directly to perform the related action. Similarly, a weather application may provide a real-time API to query a weather forecast or a location. The application content answer workflow 409 can retrieve data from the real-time application content API 433 in real-time if it determines that the query intent is related to a weather forecast for the location. Similarly, a sports application may provide a real-time API to support queries for real-time scores, and a news application can have a real-time API to provide a real-time news feed.

The query and answer manager 406 merges the ranked application content search results with search results from other contents (e.g., from the ranked Web search results received from the Web content answer workflow 408), combining their respective rankings to provide an integrated ranking with both Web content search results and application content search results (i.e., search results from different search contexts).

The query and answer manager 406 merges the rankings of search results from different search contexts. In one implementation, each search result is associated with an individualized ranking metric (e.g., a confidence score). However, in some implementations, the search results from the different search contexts may not be based on the same distribution or range. For example, search results in one search context may be ranked on 1 to 5 star ratings while search results in another search context may be ranking on a very broad, nearly continuous spectrum of ranking metric values. The query and answer manager 406 can normalize these varying ranking metric schemes based on personalized and/or aggregated parameters. In one implementation, an aggregated normalization service may provide normalization parameters across various search contexts based on back-end evaluation and/or aggregation of user interaction with search results over time. As such, as the aggregated normalization service finds that users generally find search results based on one ranking metric scheme more relevant than another, the relevance of that scheme is amplified relative to another less relevant ranking metric scheme for all users.

In another implementation, a personalized normalization service may provide normalization parameters based on a user's individual interaction with search results over time. As such, as the personalized normalization service finds that a particular user generally finds search results based on one ranking metric scheme more relevant than another, the relevance of that scheme is amplified relative to the other less relevant ranking metric scheme for that user. In one implementation, personalized normalization is given greater weight or supersedes aggregated normalization, although other preferences may be employed.

It should be understood that different types of search results (e.g., pertaining to Web content, application content, images, etc.) and search results from different search contexts may be ranked according to their own ranking and grouping schemes. When being organized for presentation in an integrated search results view, the organization may be arranged by static placement (e.g., top of page, middle of page, bottom of page, etc.) or it can be managed by dynamic placement based on ranking and grouping parameters, typically subject to some normalization among the different schemes.

A user interface support manager 454 receives the integrated search results and adds appropriate user interface parameters for delivery to the user interface 456 of the client. The search results are presented in the user interface 456 with integrated rankings, groupings, and other presentation characteristics.

Personalization data, based on user preferences and historical user behavior (e.g., collected in application content click stream 444) can be associated with a machine identifier, an account/user identifier, etc. In this manner, the same machine identifier, etc. can be submitted with the search query 402 and maintained locally and/or remotely in a user data profile (UDP) for use in refining the ranking and/or grouping of the search results for a particular machine and/or user.

In summary, Web content and application content are input to one or more indexing pipelines, which index the content to support search services. Responsive to receipt of a search query, the indexed Web content and application content is searched to generate search results. Some of the search results are annotated with contextual parameters identifying an application identifier, an action identifier, and/or other contextual information (e.g., ranking parameters, grouping parameters, etc.) for use by a search management system to generated integrated search results, install applications, launch applications, and invoke actions on content associated with a selected search result.

Figure 5:
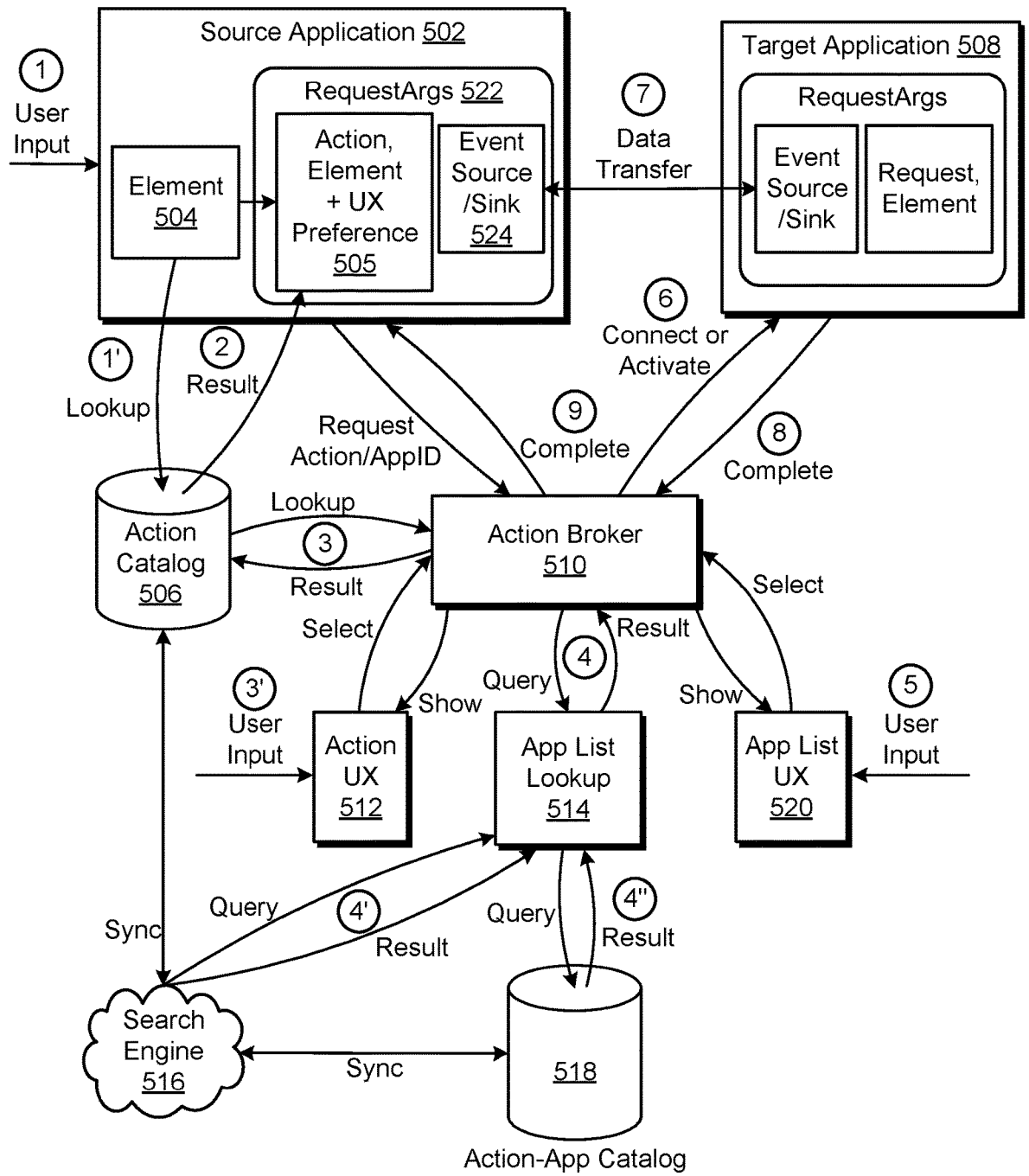
FIG. 5 illustrates a dataflow diagram for providing context-based action from a source application.

FIG. 5 illustrates a dataflow diagram 500 for providing context-based action from a source application. A source application 502 (e.g., such as a search application, a search results view feature provided by an operating system, a music player application, a contacts application, etc.) provides access to various content elements that can be used to invoke a context-based action. In one implementation, the element represents a property of an entity, such as a phone number, an email address, or a date associated with the entity.

In an operation (1), as designated by the circle containing the number "1", a user finds an element 504 in a source application 502 (or a search results view). In the case of the search results view, the corresponding source application could be a search application or a search feature of an operating system, among other options. Having identified the element, the user expresses an intent to invoke an action on the element 504 through the source application 502. For example, the user may select the phone number from a contact card of a contacts application or a search result from a search results list. In an operation (1'), the source application 502 may use its operating context to directly infer an appropriate action or associated application or to determine the appropriate action and/or associated application by referencing another data source, such as an action catalog 506. For example, if the source application 502 is a contacts application operating in a computing system with telephony capability and the selected element 504 is a phone number in a contacts card, the source application 502 may infer that the appropriate action is to invoke a telephony application (as target application 508) and place a call to that phone number. Accordingly, in the operation (1'), the source application 502 determines a possible action and/or a possible application associated with the element 504.

In an operation (2), the source application 502 packages the element, the identified action, a user interface model (e.g., a flyout, an embedded UI, a hosted window, etc.), and an event source object and invokes an action broker 510 providing the packaged data 505 as an argument to the broker invocation. The packaged data 505 may include a specified action (e.g., an action identifier) and/or a specified application (e.g., an application identifier).

If the packaged data 505 does not include an action identifier, the broker 510 looks up registered actions for the element from the action catalog 506 in an operation (3). If multiple actions are identified, whether in the packaged data or in the look-up operation, an action user interface object 512 presents the user with an opportunity to select the intended action (e.g., from a drop-down menu) in an operation (3').

In cases where the source application 502 has not specified an application identifier, the action broker 510 queries an action list look up service 514 for applications that are registered for the action/element duple. The action list look up service 514 may determine one or more appropriate applications by querying an online search service 516 in an operation (4') or an action-application catalog 518 in an operation (4"). If multiple applications are identified in the operation (4) and/or its sub-operations, an application list user interface object 520 presents the user with an opportunity to select the intended application (e.g., from a drop-down menu) in an operation (5).

The action broker 510 either activates a new instance of the target application 508 or connects to a running instance (e.g., based on a scenario preference) via an operation (6). The target application 508 receives the payload (e.g., the request arguments 522), including an event source/sink object 524 to which it can connect, from the source application 502 via a data transfer operation (7). From this point forward, the target application 508 and the source application 502 can maintain a communication channel.

After completion of the specified action, the target application 508 informs the action broker 510 that the action has been completed, in an operation (8). The action broker 510 performs any termination operation (e.g., resource garbage collection, etc.) and informs the source application 502 that the action has been completed in an operation (9).

In summary, a user can choose to launch an action on an element of content associated with a search result or on another element from within a source application (e.g., a search application, a search results view feature provided by an operating system, a music player application, a contacts application, etc.). The source application packages the action along with the content or object and sends it to a broker. The package also includes an application identifier and/or an action identifier. The broker queries a catalog to identify a target application registered under the application identifier or one or more target applications capable of performing the identified action on the content or object. The broker also queries a catalog to determine how the target application should be launched in order to perform the specified action. The broker activates the target application according to the catalog's directives and sends the action request and package to the target application for invocation of the action on the content by the target application.

In some implementations, the action is identified without identification of a specific application. In such circumstances, the catalog can identify one or more applications capable of performing the action on the content or object. These application options may be presented to the user as a prompt to determine his or her preference of application to perform the action on the content or object.

Figure 6:
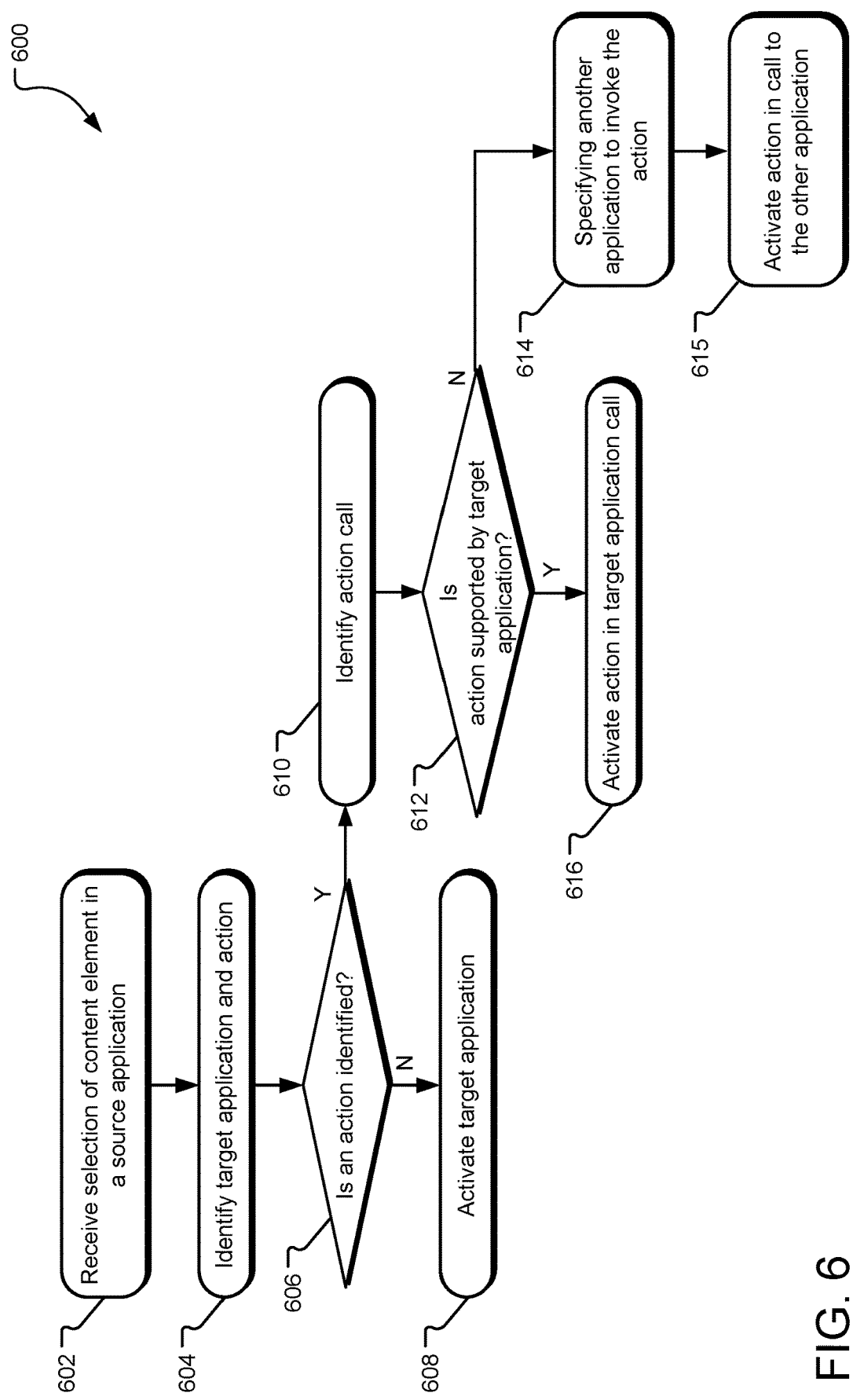
FIG. 6 illustrates example operations for providing context-based actions from a source application.

FIG. 6 illustrates example operations 600 for providing context-based actions from a source application, including without limitation a search application or a search feature of an operating system. A receiving operation 602 receives a selection of a content element. In one implementation, a selection may be detected via a user interface and an identifier of the selected content element is passed to a contextual application launcher. An identifying operation 604 parses the contextual parameters associated with the selected content element to identify a target application and an associated action. In one implementation, the content element may be a search result.

A decision operation 606 determines whether there was an action identified with the content element. If not, an activation operation 608 activates the target application (e.g., opening selected content element using the target application) without invoking a specified action. In one implementation, a contextual application launcher may perform the activation operation 608 although other components, applications, or services may perform the activation operation 608. If decision operation 606 determines there was an action identified in association with the content element, an identifying operation 610 identifies an appropriate action call associated with the target application and the identified action. An application call represents a program call the target application supports for implementing the identified action (e.g., the "mail" action can be mapped to an action call "mailto:" or a "Contacts.Email" program call, depending on the target application). A mapping database may be employed to map actions to action calls and target applications.

A decision operation 612 confirms that the identified action call is supported by the identified target application. If so, an activation operation 616 activates action in the target application using the action call (e.g., "play the audio file in the background using the media player"). In one implementation, a contextual application launcher may perform the activation operation 616 although other components, applications, or services may perform the activation operation 616. Otherwise, a revision operation 614 changes the application to be activated (from the identified target application to another application that supports the identified action) by specifying a new application that supports the identified action. Another activation operation 615 activates the identified action in a call to the newly specified application.

In alternative implementations, it should be understood that multiple application identifiers and/or action identifiers may be associated with the content element. In one implementation, a contextual application launcher may present application options or action options to a user via the user interface. Alternatively, a contextual application launcher may use user or system settings to select the most appropriate application or action for the selected content element.

Figure 7:
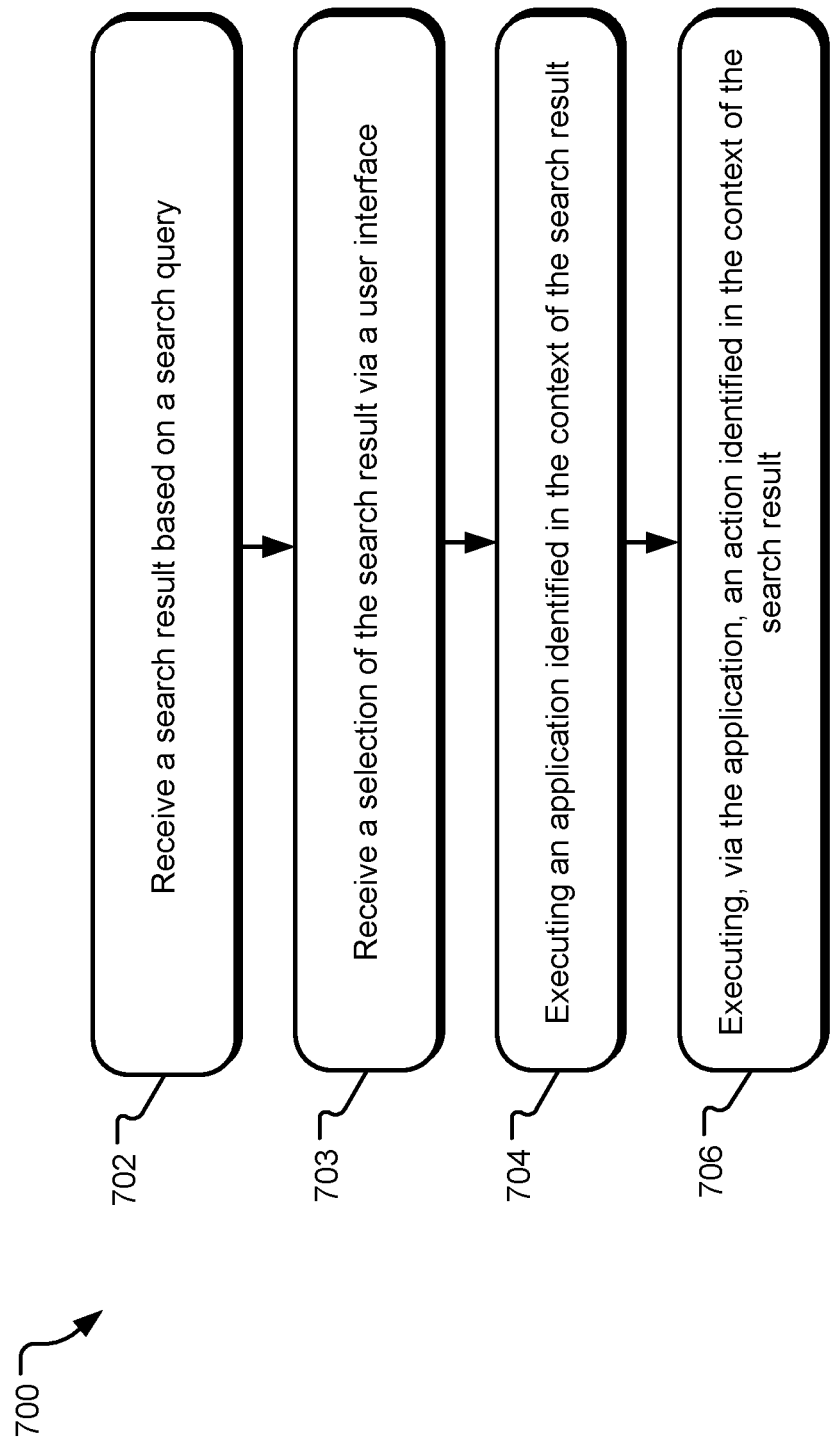
FIG. 7 illustrates additional example operations for providing context-based actions from search results.

FIG. 7 illustrates additional example operations 700 for providing context-based actions from search results. A receiving operation 702 receives a search result based on a search query. The search result is associated with contextual parameters including an application identifier and an action identifier. A selection operation 703 detects selection of the search result via a user interface. An application operation 704 executes an application identified by the application identifier. Execution may be accomplished in various ways, including launching a previously inactive application, launching an application executing in the background by bringing it to foreground operation, launching an application executing in background by passing content to the application for action on the content in the background, etc. An action operation 706 executes via the application an action identified by the action identifier. In one implementation, the action operation 706 can be performed responsive to detection of a selection of the search result via the user interface absent any subsequent or intervening receipt of input via the user interface (e.g., absent any input received after selection of the search result and before performance of the action operation).

In another implementation, multiple available application and/or action identifiers may be communicated as context with the search result. In such an implementation, responsive to receipt of a selection of a search result, a contextual application launcher may present a user with various application and/or action options that may be applied to the selected search result. Alternatively, a contextual application launcher may use user or system settings to select the most appropriate application or action for the selected search result.

Figure 8:
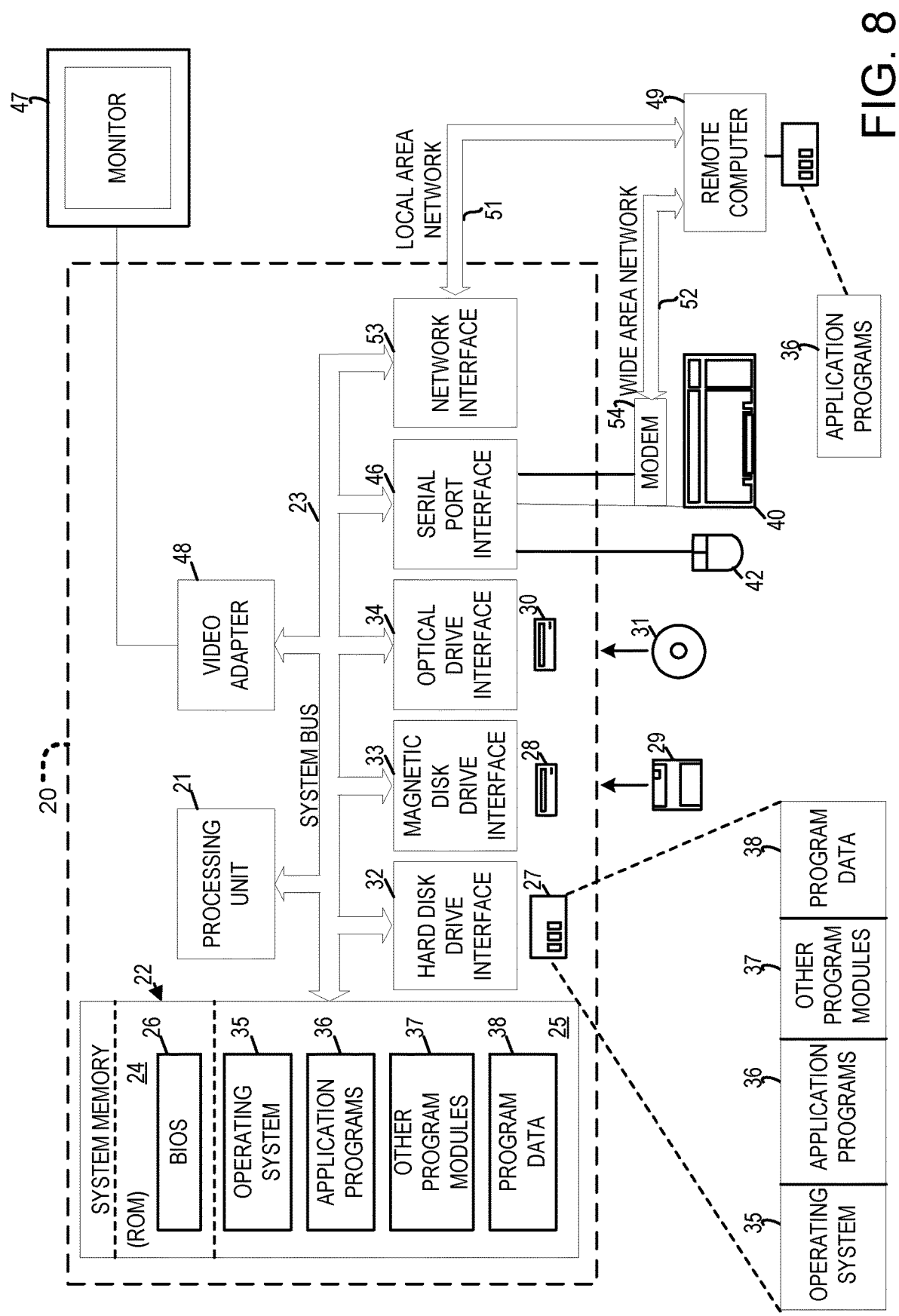
FIG. 8 illustrates an example system that may be useful in implementing the described technology.

FIG. 8 illustrates an example system that may be useful in implementing the described technology. The example hardware and operating environment of FIG. 8 for implementing the described technology includes a computing device, such as general purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
    receiving one or more search results from a search operation based on a search query, a particular search result of the one or more search results being associated with a particular application, the particular search result having multiple content elements annotated with corresponding action identifiers, wherein the action identifiers identify respective operations executable by the particular application on respective content elements of the particular search result;
    presenting the multiple content elements of the particular search result via a user interface of a computing device;
    detecting selection of a particular content element of the particular search result through the user interface, the particular content element being associated with a particular action identifier identifying a particular operation executable by the particular application on the particular content element; and
    responsive to the selection of the particular content element, triggering the particular application to perform the particular operation on the particular content element.

2. The method of claim 1, further comprising:
    selecting, from a plurality of applications, the particular application to perform the particular operation based at least on a particular application identifier specified by the particular search result.

3. The method of claim 1, wherein the search operation returns the one or more search results based on a search performed on application content in a datastore accessible through the particular application.

4. The method of claim 1, wherein the search operation returns the one or more search results based on a search performed on Web pages.

5. The method of claim 1, wherein the search operation returns the one or more search results based on a search performed on local data resources.

6. The method of claim 1, wherein the search operation returns the one or more search results based on a first search performed on Web pages and based on a second search performed on local data resources.

7. The method of claim 1, wherein the triggering launches the particular application and causes the particular application to perform the particular operation as a background operation, responsive to the selection of the particular content element absent any subsequent input through the user interface.

8. The method of claim 1, further comprising:
    presenting a plurality of available applications for execution, responsive to selection of at least one other search result.

9. The method of claim 1, further comprising:
    presenting a plurality of available actions, responsive to selection of at least one other search result.

10. One or more tangible computer-readable storage devices encoding computer-executable instructions which, when executed on a computer system, cause the computer system to perform a computer process comprising:
    receiving one or more search results from a search operation based on a search query, wherein a particular search result of the one or more search results has multiple content elements and the particular search result specifies corresponding operations for a particular application to perform on individual content elements of the particular search result;
    outputting the multiple content elements of the particular search result;
    detecting input selecting a particular content element of the particular search result, wherein the particular search result specifies a particular operation for the particular application to perform on the particular content element; and
    responsive to the detecting the input, triggering the particular application associated with the particular search result to perform the particular operation on the particular content element of the particular search result.

11. The one or more tangible computer-readable storage devices of claim 10, wherein the search operation returns the one or more search results based on a search of application content in a datastore accessible through the particular application.

12. The one or more tangible computer-readable storage devices of claim 10, wherein the search operation returns the one or more search results based on a search of Web pages.

13. The one or more tangible computer-readable storage devices of claim 10, wherein the search operation returns the one or more search results based on a search of local data resources.

14. The one or more tangible computer-readable storage devices of claim 10, wherein the search operation returns the one or more search results based on a first search of Web pages and based on a second search of local data resources.

15. The one or more tangible computer-readable storage devices of claim 10, wherein the triggering causes the particular application to perform the particular operation as a background operation.

16. A system comprising:
    a processing unit; and a tangible computer-readable device storing computer-readable instructions which, when executed by the processing unit, cause the processing unit to:

receive one or more search results from a search operation based on a search query, a particular search result of the one or more search results being associated with a particular application, the particular search result having multiple content elements and action identifiers specifying corresponding operations executable by the particular application on search result content associated with the particular search result; and responsive to selection of a particular content element:
determine a particular action identifier, associated with the particular content element, that identifies a particular operation for the particular application to perform on the search result content associated with the particular search result; and trigger the particular application to perform the particular operation on the search result content associated with the particular search result.

17. The system of claim 16, wherein the particular search result is received with contextual metadata identifying at least:
the particular application,
a first action identifier of a first operation executable by the particular application on a first content element of the particular search result, and
a second action identifier of a second operation executable by the particular application on a second content element of the particular search result.

18. The system of claim 17, wherein the particular search result identifies a contact, the first content element of the particular search result comprises a phone number of the contact, and the second content element of the particular search result comprises an email address of the contact.

19. The system of claim 18, wherein the computer-readable instructions, when executed by the processing unit, cause the processing unit to:
trigger the particular application to call the phone number when the first content element of the particular search result is selected; and
trigger the particular application to initiate an email to the email address when the second content element of the particular search result is selected.

20. The system of claim 16, wherein the particular search result uniquely identifies the particular application.

* * * * *